(No Model.)
A. BRYANT.
PIPE COUPLING.
No. 520,514. Patented May 29, 1894.
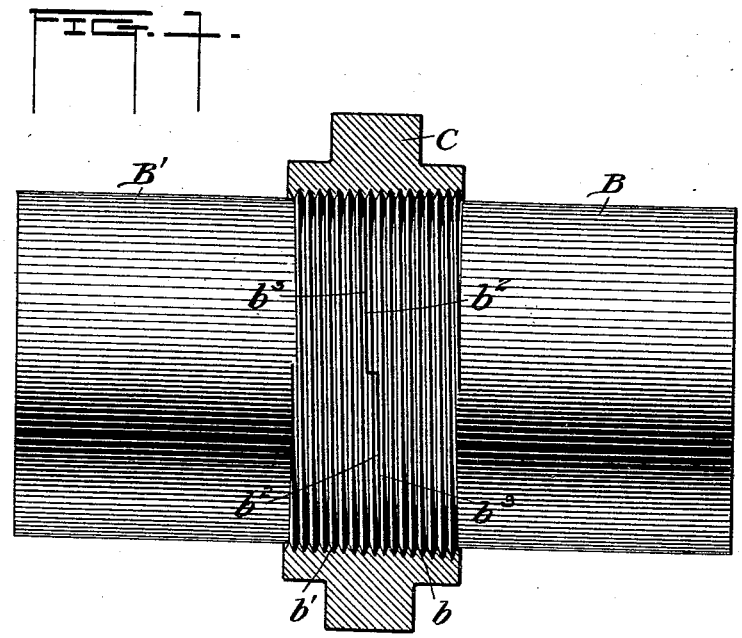
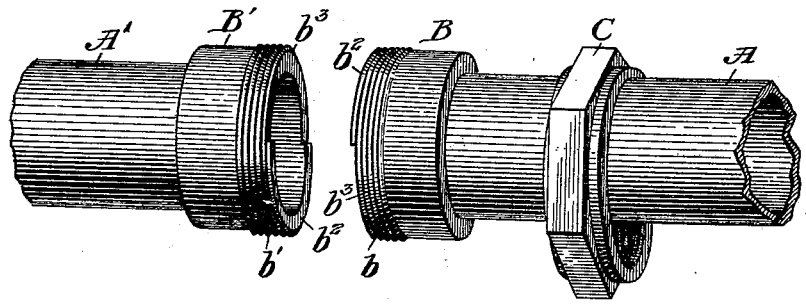
Witnesses
Inventor
Alexander Bryant
By Butterworth & Dowell
his Attorneys.

UNITED STATES PATENT OFFICE.

ALEXANDER BRYANT, OF NEW YORK, N. Y.

PIPE-COUPLING.

SPECIFICATION forming part of Letters Patent No. 520,514, dated May 29, 1894.

Application filed November 20, 1891. Serial No. 412,463. (No model.)

*To all whom it may concern:*

Be it known that I, ALEXANDER BRYANT, a citizen of the United States, residing at New York, in the county of New York and State of New York, have invented certain new and useful Improvements in Pipe-Couplers; and I do hereby declare the following to be a full, clear, and exact description of the invention, such as will enable others skilled in the art to which it appertains to make and use the same.

This invention relates to pipe couplings, and consists in certain improved features of construction and combination of parts all as will be hereinafter more fully described, and particularly pointed out in the claim at the end of the description.

The objects of the invention are, first, to provide a simple and durable pipe connection adapted to form a tight joint between sections of pipe without the use of packing; second, to so construct and arrange the parts of the coupling that the same may be readily connected or disconnected without rotating or otherwise disturbing the sections of pipe, and so that the pipe ends can be brought into proper position to be connected without any longitudinal movement; thus peculiarly adapting the device for use in connecting pipe sections that cannot be moved longitudinally, but may be moved laterally without difficulty.

In the accompanying drawings, which form a part of this specification, Figure 1 represents a side elevation of the coupling sections; the nut uniting the same being shown in vertical section; and Fig. 2 is a perspective view showing the parts disconnected.

Similar letters of reference denote similar parts.

A, A', are the pipe sections; B, B', the two parts of the coupling, and C, the nut for uniting said parts. The fixtures or parts B, B', of the coupler, are provided with raised exterior screw-threads $b$, $b'$, which are tapered and are so formed that the taper is uniform from the beginning of the thread on one part to its end on the other part, the thread on each part being an entirety and continuous from part to part when joined together. In practice this taper will be slight and only enough to effect the desired result, that is, to cause the nut to bind on its thread, and thereby form a tight joint.

To enable the parts B, B', to be brought together with the screw-threads of one part entire and properly matched with those of the other, so as to form a tight joint, without the use of packing, and at the same time to adapt the coupling to be connected and disconnected without rotating or disturbing the pipe sections and without appreciable longitudinal movement, the meeting faces of said parts B, B', have an off-set formation as shown, so as to provide opposing bearing faces which are arranged in different planes. This I accomplish by forming the meeting faces of the adjoining ends of the parts B, B', each with a slightly off-set portion $b^2$, and a recessed portion $b^3$, which may be of the segmental or semi-cylindrical shape shown, and are opposed to each other, that is to say, the bearing face $b^2$, of one part is opposite the bearing face $b^3$, of the other part, so that when the two parts are brought together the off-set on one part will occupy the recess in the other part, flush with each other. With the two parts thus united and firmly held together the thread or threads are cut on both parts at one operation, so as to form a continuous unbroken thread extending from one part onto the other without cutting or splitting a thread, except transversely. I thus provide a separable, two-part pipe-section or coupling, the adjoining ends of which have an exterior screw-thread which extends from one part to the other in a continuous, unbroken ridge; thus separating the parts in two different planes, the lines of separation or direction of cut being in the plane of the threads and substantially perpendicular to the axis of the pipe but upon two different planes, the thread or threads being cut at an angle or transversely of said axis, preferably at diametrically opposite points, to effect the separation. By this means it is only necessary in connecting and disconnecting the parts to move the pipe ends longitudinally one-half the thickness of a single thread or threads, or practically not at all, this movement being inappreciable in practice, and when the parts are brought together they cannot turn so as to disarrange the continuity of the thread and thereby prevent the nut C, from being screwed on over the joint, without difficulty and injury to the threads. Furthermore, adapting the pipe ends to be brought into proper position to be connected without any longitudinal movement, is of great utility in practice, for it often occurs, in steam and boiler fitting, that two pipe sections are to be connected that cannot be moved longitudinally but may be moved laterally without difficulty, and where a connection is to be made for the purpose mentioned it becomes very important that the coupling be of such form as to permit the pipes to be brought into position without longitudinal movement, that is to say, wholly by a lateral movement, and this is accomplished by the described construction in a manner and to an extent which cannot be attained with devices of this same general character heretofore in use.

An additional advantage resides in the fact that the thread upon each part of the coupling is complete and uniform throughout its length, and when the two parts are brought together the abutting ends or terminals of the thread upon said parts exactly coincide and meet flush with each other, so that a perfectly tight joint is formed and the combined strength of the continuous thread from end to end of the spiral is utilized in holding the parts together, without the difficulty in securing a tight joint or the tendency to weaken the coupling which results from splitting a thread, as has been done in devices heretofore proposed. Moreover, this construction affords a smooth water-way or passage and dispenses with protuberances or projections upon one part of the coupling fitting corresponding recesses upon the opposite part to prevent rotation, which projections are objectionable because of the difficulty in securing a perfectly tight joint, because of the extra space required to connect the coupler with right and left couplings or ground unions, and because of the internal obstructions in the water-way or passage through the coupling in such previous devices.

I am aware that it has heretofore been proposed to form a joint by lapping the contiguous ends of two rods to be coupled together past each other and cutting a screw thread thereon running from one section to the other, and uniting the rods by a nut screwed thereon. It has also been proposed to provide a two-part pipe coupling having a similar external tapering screw thread and a union nut screwed upon said thread, and also to connect piping by means of a lap-joint and an external tapered sleeve for securing the parts together; hence I make no broad claim to such constructions. But in such prior devices it will be observed that the line of separation of the parts is tangential to the plane of the threads, so as to divide or split the threads longitudinally, with the deleterious effects hereinbefore mentioned, and furthermore, considerable longitudinal movement of the parts is necessary in order to connect or disconnect the coupling, all of which objections are overcome by my improvement.

What I claim, and desire to secure by Letters Patent, is—

A pipe coupling comprising a separable pipe section composed of two members having upon their adjoining ends an external tapering screw thread extending continuously from member to member; the line of separation of said parts being taken in a plane extending in the plane of the external thread thereon substantially perpendicular to the axis of the pipe, partly across the same, thence at an angle to said axis sufficient to bisect the thread and continuing in the plane of the thread, so as to effect a separation upon different planes, but approximately the same plane, thereby providing co-incident interlocking bearing faces and an external thread on each member complete in itself to its junction with the thread upon its fellow forming a continuation thereof; together with an internally tapered screw threaded nut adapted to be screwed upon said parts so as to bind them together, whereby a tight joint is formed, without packing, and the two parts are united and secured against rotation, while the coupling is adapted to be connected or disconnected by a lateral or sidewise movement of said parts, without longitudinal movement thereof, substantially as described.

In testimony whereof I affix my signature in presence of two witnesses.

ALEXANDER BRYANT.

Witnesses:
  WM. C. MACDONALD,
  RICHARD F. MAGUIRE.